United States Patent [19]
Stone et al.

[11] 3,942,387
[45] Mar. 9, 1976

[54] REPLACEABLE FREEWHEEL UNIT FOR HELICOPTERS

[75] Inventors: Robert A. Stone, Stratford; Ray D. Leoni, Woodbridge, both of Conn.

[73] Assignee: United Technologies Corporation, Hartford, Conn.

[22] Filed: Oct. 15, 1974

[21] Appl. No.: 514,853

[52] U.S. Cl. .................. 74/417; 64/4; 74/421 A
[51] Int. Cl.² ........................................ F16H 1/20
[58] Field of Search ......... 74/416, 413, 421 A; 64/4

[56] References Cited
UNITED STATES PATENTS

| | | | |
|---|---|---|---|
| 3,226,987 | 1/1966 | McCarty | 74/417 X |
| 3,442,444 | 5/1969 | Kievit | 74/417 X |
| 3,871,242 | 3/1975 | Linstromberg | 74/421 A |

*Primary Examiner*—John J. Camby
*Attorney, Agent, or Firm*—Maurice B. Tasker

[57] ABSTRACT

An angle gear box for a helicopter main rotor drive has a more compact arrangement of the usual gear train elements of the input section as well as a freewheel unit. The input section gear train includes a power input shaft mounted on bearings and having a bevel pinion and a power output shaft mounted on bearings and having a bevel gear meshing with the pinion. The output shaft has an axial chamber in which the freewheel unit is housed and from which it can be readily removed without disturbing the mounting elements of the gear train and the critical relationship of the high speed bevel gears.

10 Claims, 2 Drawing Figures

REPLACEABLE FREEWHEEL UNIT FOR HELICOPTERS

BACKGROUND OF THE INVENTION

1. Field of the Invention

This invention relates to helicopters and particularly to means for transmitting power from the output shaft of an engine to the angularly related main rotor drive shaft of the helicopter. Such a power transmitting means usually consists of an angle gear box in which the meshing bevel gears are mounted on bearings carried by the gear box. A freewheel unit is associated with the gear box, either externally thereof or within the gear box which in flight enables the rotor to continue to rotate in autorotation free from the engine if the latter is stopped or is rotating very slowly.

2. Description of the Prior Art

Prior to this invention all the elements of the transmission were either enclosed in a single gear box, in which case it was extremely difficult or impossible to gain access to critical units of the transmission, or various units were mounted externally of the gear box where they could be serviced. Where elements of the transmission could be removed, this could be done only by disturbing other elements of the gear train which require critical adjustment in reassembly.

SUMMARY OF THE INVENTION

It is an object of this invention to provide an improved angle gear box for a helicopter main rotor drive in which modular assemblies are provided in a single gear box to provide all of the various functions of the power input section.

Another object of this invention is to provide such an angle gear box in which a power input shaft, a power output shaft and a freewheel module are all independently supported in the gear box and in which the freewheel module can be removed for service without disturbing elements of the input and output shafts.

A further and important object of the invention is the provision of a freewheel unit inside the gear box which can be removed and reinstalled without altering the critical mesh and alignment of the high speed bevel gears on the input and output shafts.

A still further object of the invention is the provision of a removable freewheel unit inside the gear box consisting essentially of an axial torque assembly which can be removed by axial withdrawal and can be replaced in the same manner with great facility.

More specifically it is an object of this invention to provide an improved and more compact angle gear box input section for a helicopter main rotor drive in which a power input shaft and a power output shaft are provided each mounted on bearings in the gear box and having a bevel pinion and an intermeshing bevel gear, respectively. To obtain compactness of the input section, the output gear shaft is enlarged at one end to provide a chamber which is occupied by the freewheel unit. The freewheel unit, or module, is a unidirectional axial torque assembly which can be readily withdrawn from this shaft chamber through an access port provided in the gear case. This module may be easily reinserted into this chamber to complete the power train's torque transmitting continuity by connecting its input and output members to that of the output gear and torque shaft respectively.

DESCRIPTION OF THE PREFERRED EMBODIMENT

Figure 1:
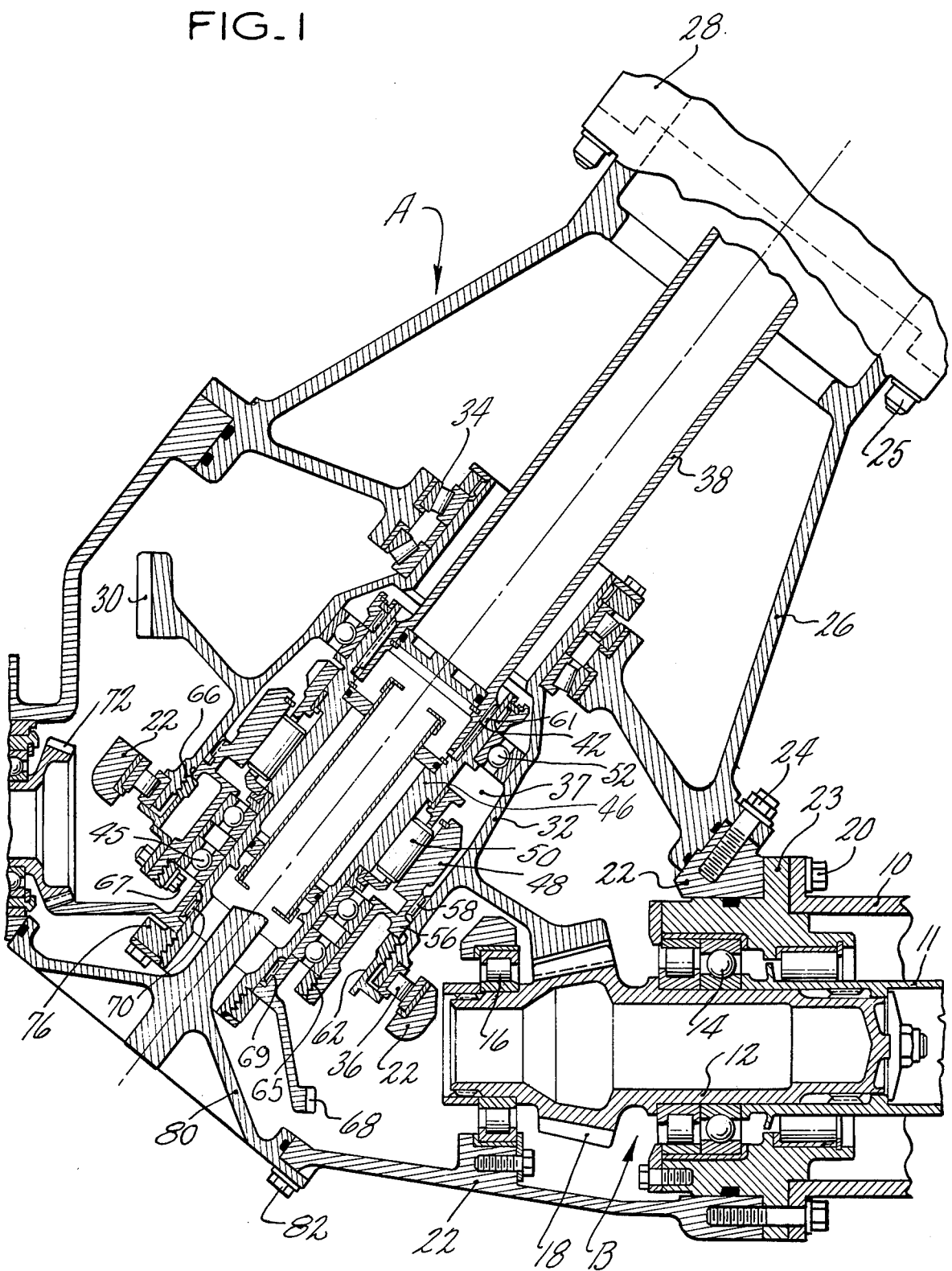
FIG. 1 is a sectional view through the improved angle gear box input section.
Figure 2:
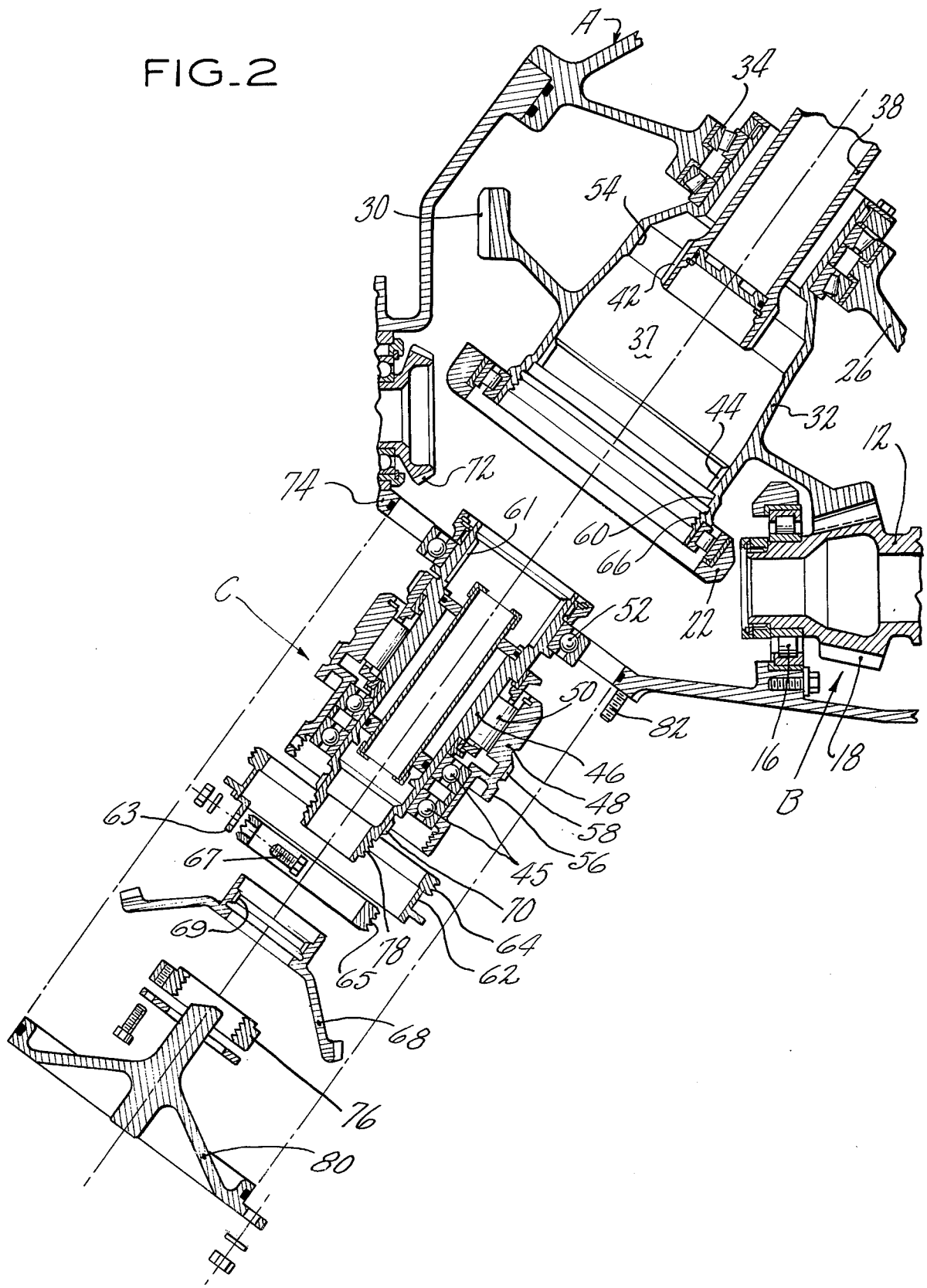
FIG. 2 is a sectional view on a somewhat smaller scale showing the freewheel unit withdrawn from the gear box.

The improved angle gear box shown in FIGS. 1 and 2 of the drawings includes an engine support housing 10 on which the gear box input section, generally indicated at A, is mounted. The engine, of which only the shaft 11 is shown, drives a power input shaft 12 mounted on bearings 14 and 16 of module B and carries a bevel pinion 18 located on shaft 12 between bearings 14 and 16. Input module B is removably attached to support housing 10 and to gear box section A by cap screws 20 and can be removed bodily from the gear box without disturbing input shaft 12 or bearings.

Input module cartridge 23 is secured to input module center housing 22 (FIG. 1) by fasteners 20. Center housing 22 is in turn connected to the outboard flange of transition housing 26 by fasteners 24. Transition housing 26 connects input housing module 22 to the main transmission module 28 by fasteners 25. The main transmission module 28 contains additional reduction gearing in addition to supportive members for the helicopter main rotor system which is not shown.

An angled power output shaft 32 is supported on transition housing 26 at its inner end by roller bearings 34 and is supported at its outer end on center housing 22 by a bearing 36. Power output shaft 32 is tubular and is enlarged at its outer end to form an axial chamber 37. About midway of the enlarged end, shaft 32 carries a bevel gear 30 which meshes with bevel pinion 18.

A torque shaft 38 connects the output side of the freewheel module C with the main transmission module through a subsequent reduction gear set not shown. In this manner the power of two or more input modules may be combined in the main transmission module 28 (not shown) to drive the main rotor system of the helicopter. Torque shaft 38 therefore extends into the freewheel module chamber 37 mating external spline 42 with freewheel module internal spline 61.

Freewheel unit C includes inner and outer sleeves 46, 48 which are mounted for relative rotation on bearings 45 located between them and are connected at their inner ends by clutch rollers 50 which react with inclined surfaces, or ramps, on one of the sleeves to drive the inner sleeve in power-on rotation of the gear train but allow the inner sleeve to rotate freely relative to sleeve 48 under power-off conditions when the rotor is turning in autorotation.

Inner sleeve 46 carries a support bearing 52 which can be moved axially with unit C into position to engage bearing support surface 54 on shaft 32. Sleeve 48 carries a pilot flange 56 and input splines 58 (FIG. 2) which mate respectively with a bore 60 and splines 44 on shaft 32. With the above mating parts in engagement, internal splines 61 on inner sleeve 46 will mate with external splines 42 on torque shaft 38 thus establishing a driving connection between output shaft 32 and torque shaft 38 through the freewheel unit.

Freewheel unit C is releasably held in operating position in chamber 37 by a sleeve 62 which is externally threaded at 64 and is threaded into the outer end of shaft 32 which is provided with internal threads 66. Sleeve 62 bears against sleeve 48 of unit C to provide axial support for the latter. Lock tab 63 is keyed to sleeve 62 and is connected to sleeve 48 by bolt 67 to secure sleeve 62. Bolt 67 also serves to secure bearing retaining nut 65.

Accessory bevel gear 68 is driven by splines 69 which mate with splines 70 of inner sleeve 46, the output side of freewheel unit C. Gear 68 meshes with bevel pinion 72 (FIG. 2) to drive the accessories located in housing 74 which is secured to housing 22 by suitable bolts (not shown). Accessory drive gear 68 is secured to unit C by means of a nut 76 which engages threads 78 on inner sleeve 46 of unit C. Gear box A has an opening axially aligned with output shaft 32 that is closed by a cover 80 secured to the gear box by fasteners 82 and has a diameter at least as great as the diameter of chamber 37 to permit release of unit C and its easy withdrawal from the gear box.

In operation, power is transmitted from the engine through shaft 12 and pinion 18 to gear 30 and into the outer sleeve 48 of freewheel unit C by input splines 58 and 44. Power is then transmitted across the locked freewheel unit rollers 50 to the inner sleeve 46 of this unit and thence to the torque shaft 38 by connection of splines 61 and 42.

With the engine power off and the rotor turning in autorotation, the inner sleeve 46 of unit C will rotate on bearings 45 relative to the engine connected sleeve 48. The connecting splines 69 and 70 on accessory drive gear 68 and sleeve 46 allow this gear to drive the accessories in this mode of operation.

To withdraw and replace the freewheel unit C does not require the disassembly of any element of the power train on either the power input or the power output side of unit C. Power input module B including pinion 18 and bearings 14, 16 are not disturbed. Also gear 30 and its shaft 32 mounted on transition housing 26 and torque shaft 38 remain undisturbed. This is particularly important because shafts 12 and 32 which carry mating bevel gears 18 and 30 transmit the entire power output to the main rotor at high speed and consequently are subjected to tremendous lateral thrust loads as they transmit this power around an acute corner. Accordingly it is very important that the initial shimmed adjustment of these gears and their precise relationship to one another should not be disturbed by maintenance to unit C. Unit C on the contrary does not require the same accuracy of axial location relative to other system components since its driving parts are concentric and required to transmit torque through axially engageable splined connections.

The freewheel unit C, in its operating position, is supported within the bell-shaped chamber of shaft 32 at its inner end by bearing 52 which mates with bore 54. It is guided into this position by engagement of pilot flange 56 on sleeve 48 with bore 60 which assists in engaging splines 58 with mating splines 44 on shaft 32. Bearings 52 and bore 54 as well as the mating splines can be made with a free sliding fit, since unit C transmits torque only and is not subject to axial loads.

While we have shown only one embodiment of our invention, we do not wish to be limited to the exact details shown herein, as various modifications will occur to one skilled in this art which fall within the scope of the following claims.

For example, the invention may be practiced using a freewheel unit wherein the inner sleeve is the driver member and the outer sleeve is the driven member. Similarly, the use of internal or external splines is optional.

We claim:

1. In a helicopter main rotor drive, an angle gear box, a power input shaft mounted on bearings in said gear box having a bevel pinion, an angularly related output shaft mounted on bearings in said gear box having a bevel gear meshing with said pinion, said output shaft comprising a tubular member having a bell-shaped outer end forming an axial chamber of substantial diameter, said gear box having an unobstructed opening aligned with the chamber in said output shaft at least as large in diameter as the diameter of said chamber, a torque shaft coaxial with the inner end of said output shaft with its outer end in communication with said chamber, and a clutch and freewheel unit axially insertable into said chamber and axially removable therefrom through said opening, said unit and both said output shaft and said torque shaft having cooperating axial splines for establishing a driving connection between said output shaft and said torque shaft upon insertion of said unit into said chamber.

2. In a helicopter main rotor drive, an angle gear box, a generally horizontal power input shaft mounted on bearings in said gear box having a bevel pinion, an angularly related output shaft mounted on bearings in said gear box having a bevel gear meshing with said bevel pinion, said output shaft comprising a tubular member having a relatively small-diameter inner portion and having its outer portion enlarged to form a chamber of substantial diameter, one of the bearings for said output shaft being located at its smaller end portion and another being located adjacent the mouth of said chamber, a concentric torque shaft extending from the small-diameter end portion of said output shaft, said gear box having an opening axially aligned with and adjacent the outer end of said output shaft at least as large in diameter as the diameter of said chamber, a cover forming a closure for said opening, and a clutch and freewheel unit insertable axially through said opening into said chamber and removable axially therefrom, said unit comprising an axial torque assembly including concentric inner and outer sleeves having axially spaced bearings and clutch rollers therebetween, one of said sleeves having ramps cooperating with said rollers to lock said sleeves for rotation as a unit in one direction of rotation, means for connecting one of said sleeves to said output shaft and said other sleeve to said torque shaft by the axial insertion of said unit into said chamber, and means accessible through said opening in said gear box for releasably locking said unit in its shaft connecting position within said chamber.

3. In a helicopter main rotor drive, an angle gear box, a generally horizontal power input shaft mounted on bearings in said gear box and having a bevel pinion, an angularly related output shaft mounted on bearings in said gear box comprising a tubular member of relatively small diameter at its inner end having its other end enlarged to form an axial chamber of substantial diameter open at its outer end, one of the bearings for said output shaft being located externally of its smaller end and another being located externally of the open end of said chamber, a bevel gear mounted between said bearings on said output shaft meshing with said bevel pinion, a torque shaft concentric with said output shaft extending from the inner end of the latter, said torque shaft having splines at its extended end, said output shaft having an internal bore for a bearing located adjacent said splined end of said torque shaft and also having axial splines within said chamber, said gear box having an opening axially aligned with said output shaft and at least as large in diameter as the diameter of said chamber, and a freewheel unit comprising an axial torque assembly in said chamber, said unit including spaced inner and outer sleeves having bearings and clutch rollers between them, one of said sleeves having ramps cooperating with said rollers to lock said sleeves as a unit in one direction of rotation, said unit also having means for connecting said output shaft to said torque shaft comprising external axial splines on one of said sleeves meshing with the internal splines on said output shaft and axial splines on the other of said sleeves meshing with the splines on the end of said torque shaft, a bearing fixed on the inner end of said freewheel unit axially insertable into said internal bore of said output shaft, and means at the open end of said chamber for releasably locking said freewheel unit to said output shaft against axial displacement from said chamber.

4. The combination of claim 3 in which the means for releasably locking said freewheel unit against axial displacement from the chamber in said output shaft comprises means accessible through said opening in said gear box for releasably connecting one of said sleeves of said freewheel unit to the outer end of said output shaft.

5. The combination of claim 3 in which circumferential guiding means is provided on one of said sleeves adjacent the splines on said sleeve for facilitating the axial insertion of said freewheel unit into said chamber.

6. In a helicopter main rotor drive, a compact angle gear box, a generally horizontal power input shaft mounted on bearings in said gear box having a bevel pinion, an angularly related output shaft mounted on bearings in said gear box having a bevel gear meshing with said bevel pinion, said output shaft comprising a tubular member of relatively small diameter at its inner end and a larger diameter at its outer end forming an axial chamber of substantial diameter, axial splines on the internal surface of said output shaft, a torque shaft extending from the inner end of said output shaft having a splined end communicating with said chamber, said gear box having an opening aligned with the chamber in said output shaft which is substantially as large as the diameter of said chamber, a cover forming a removable closure for said opening, and means axially insertable through said opening into said chamber and readily removable therefrom for operatively connecting said output shaft with said torque shaft comprising a freewheel unit, said unit including an axial torque assembly having spaced inner and outer sleeves with axially spaced bearings and clutch rollers therebetween, one of said sleeves having ramps cooperating with said rollers to lock said sleeves for rotation as a unit in one direction of rotation, axial splines on the surfaces of both of said sleeves engageable with the splines on the surface of said output shaft and said torque shaft upon axial movement of said freewheel unit into said chamber, and means at the open end of said chamber for securing said unit removably in said chamber including means for securing the outer sleeve of said unit to said output shaft.

7. In a helicopter main rotor drive, an angle gear box, a power input shaft mounted on bearings in said gear box having a bevel pinion, an output shaft angularly related to said input shaft mounted on bearings in said gear box having a bevel gear meshing with said pinion, said output shaft comprising a tubular member of relatively small diameter at its inner portion having its outer portion enlarged to form a chamber of substantial diameter, a torque shaft concentric with said output shaft communicating with said chamber through the small-diameter end portion of said output shaft, said gear box having an opening of substantial diameter aligned with the chamber in said output shaft, and a freewheel unit freely removable from said chamber and freely insertable into said chamber through said opening for completing the driving connection between said output shaft and said torque shaft while the adjustment of said bevel gear and pinion and the bearings for their mounting shafts remain undisturbed.

8. In a helicopter main rotor drive, a compact angle gear box, a power input shaft mounted on bearings in said gear box having a bevel pinion, a tubular power output shaft in said gear box angularly related to said input shaft having a bevel gear meshing with said pinion, said output shaft having a relatively small diameter portion at one end at which one of its bearings is located and having a larger diameter portion at its other end forming a large diameter chamber of substantial axial length at which another of its bearings is located, said output shaft having axial splines on its internal wall, said gear box having an opening axially aligned with said chamber of a diameter approximately as large as the diameter of said chamber, a torque shaft in communication with the small diameter portion of said output shaft having a splined outer end, a clutch and freewheel unit insertable through said opening in said gear box into said chamber and freely removable therefrom, and means for establishing a driving connection between said output shaft and said torque shaft by the axial insertion of said freewheel unit into said chamber including splines on said unit which mesh with said axial splines on said output shaft wall and with the splines on said torque shaft.

9. In a helicopter main rotor drive, an angle gear box, a power input shaft mounted on bearings in said gear box having a bevel pinion, an output shaft angularly related to said input shaft having a bevel gear meshing with said pinion and mounted on bearings in said gear box, said output shaft comprising a tubular member of relatively small diameter at its inner portion and having its outer portion enlarged to form a chamber of substantial diameter, a torque shaft for the main rotor drive concentric with said output shaft having its outer end extended through said small-diameter portion of said output shaft into said chamber, said gear box having an unobstructed opening axially aligned with said chamber of a diameter approximately as large as the diameter of said chamber, and means operative to make and break the driving connection between said output shaft and said torque shaft with the adjustment of said bevel gear and pinion and the bearings for their mounting shafts undisturbed, comprising a freewheel unit freely removable from said chamber and freely insertable into said chamber through said opening in said gear box.

10. The main rotor drive shaft for a helicopter recited in claim 9 in which the freewheel unit includes inner and outer concentric sleeves, one of which has a ramp, and a cooperating roller between said sleeves to lock said sleeves for rotation as a unit in one direction of rotation, said sleeves having axial splines which cooperate with axially aligned splines on the outer end of both said output shaft and said torque shaft to establish the driving connection between said shafts when said freewheeling unit is inserted axially into said chamber.

* * * * *